UNITED STATES PATENT OFFICE.

GEORGE A. MACBETH, OF PITTSBURGH, PENNSYLVANIA; GEORGE D. MACBETH, EXECUTOR OF SAID GEORGE A. MACBETH, DECEASED, ASSIGNOR TO MACBETH-EVANS GLASS COMPANY, OF PITTSBURGH, PENNSYLVANIA, A CORPORATION OF PENNSYLVANIA.

GLASS.

1,214,202. Specification of Letters Patent. Patented Jan. 30, 1917.

No Drawing. Application filed April 12, 1915. Serial No. 20,643.

*To all whom it may concern:*

Be it known that I, GEORGE A. MACBETH, a citizen of the United States, residing at Pittsburgh, in the county of Allegheny and State of Pennsylvania, have invented certain new and useful Improvements in Glass, of which the following is a specification.

The invention relates to an improvement in glass intended primarily for use in the manufacture of blown illuminating ware such as shades, globes, and the like, although suitable for use in pressed ware both for illuminating and other purposes. The invention has for its principal objects; the provision of a glass which in light transmitting properties lies between milk glass which is too dense and glass made under my Reissue Patent No. 13,766, which is not dense enough where the shades or globes are thin and the light intense; the provision of a glass of the character specified which, when used in a thin shade, will present a white luminous appearance, permitting a proper illumination by the transmitted light without showing the illuminating element; and the provision of a glass which is cheap, easily worked, without a red or yellow tint, and capable of withstanding a very high temperature without breaking.

The foundation batch which I prefer to employ is as follows:

| | |
|---|---|
| Sand | 1000 parts |
| Potash | 190 " |
| Zinc oxid | 240 " |
| Borax | 66 " |
| Salt | 5 " |

The foregoing batch, which aggregates about 1500 parts, if used without coloring ingredients, will produce a substantially colorless clear glass. Various substitutes for the elements might be used to form this clear glass batch, but the ones given are preferred.

To the foregoing clear glass batch of 1500 parts are added the coloring or opacifying ingredients comprising preferably the following compounds and quantities:

| | |
|---|---|
| Hydrate of aluminum | 190 parts |
| Fluorspar | 135 " |
| Sodium silico fluorid | 150 " |

The clear glass batch with the foregoing coloring compounds are thoroughly mixed together and melted at a temperature of from 2700° F. to 2800° F.

The hydrate of aluminum ($Al_2H_6O_6$) contains 65.4% of oxid of aluminum ($Al_2O_3$) and the percentage of aluminum is 34.6%, so that the 190 parts of aluminum hydrate has an aluminum oxid content of 124.2 parts and an aluminum content of 65.7 parts. As the aluminum oxid is the coloring agent, other compounds containing the oxid, such as china clay and feldspar might be used instead of the hydrate, if an adjustment were made so as to secure the proper amount of the coloring agent.

The fluorspar ($CaF_2$) contains 48.7% of fluorin, so that in the 135 parts of fluorspar there is 65.7 parts of fluorin. Other fluorin compounds might be used, such as cryolite, if an adjustment were made to secure the proper amount of fluorin.

The sodium silico fluorid ($Na_2SiF_6$) contains 60.6% of fluorin so that in the 150 parts of this compound there are 90.9 parts of fluorin. Some other fluorid might possibly be substituted for the sodium silico fluorid if an adjustment were made to secure the proper amount of fluorin. The total fluorin content in the fluorspar and sodium silico fluorid is 65.7 parts plus 90.9 parts or 156.6 parts.

It will be understood that, aside from the substitution of equivalent compounds for those above indicated, the proportions of the elements might be modified to a considerable extent and still produce substantially the same glass as that produced when the exact formula as above set forth, is employed. For instance, the aluminum oxid content may be varied between 80 and 160 parts, the fluorspar between 100 and 170 parts, and the sodium silico fluorid between 100 and 200 parts. The formula and proportions as above set forth, are, however, the ones which are preferred by me and which have produced the glass having the qualities referred to and also stated later. The glass as produced from the foregoing formula will stand a very high temperature without breaking, such quality being particularly advantageous when the glass is used in connection with high power nitrogen and gas lamps giving out an intense heat. The glass is also desirable with such high power illuminating elements since it diffuses the light without permitting the lighting element to be seen, and this is the case even with a relatively thin blown shade or globe. At the same time, the glass permits of the passage of a large percentage of the light so that a proper illumination is secured by the transmitted light, such as could not be secured with the relatively dense milk glasses heretofore known in the prior art. In appearance, the glass is white and luminous and without the objectionable yellow or brown tinge characteristic of opal glasses. The glass furthermore, is very easily worked and relatively cheap.

What I claim is:

1. A glass formed by fusing together a mixture containing approximately the following proportions; 1500 parts of foundation batch capable of making substantially clear glass, 124 parts of aluminum oxid, 135 parts of fluorspar and 150 parts of sodium silico fluorid.

2. A glass formed by fusing together a mixture containing approximately the following proportions; 1500 parts of foundation batch capable of making substantially clear glass, 124 parts of aluminum oxid, 135 parts of a fluorid containing about 50% by weight of fluorin, and 150 of sodium silico fluorid.

3. A glass formed by fusing together a mixture comprising 1500 parts of a foundation batch capable of making substantially clear glass, 80 to 160 parts of aluminum oxid, 100 to 170 parts of a fluorid containing about 50% by weight of fluorin, and 100 to 200 parts of sodium silico fluorid.

4. A glass formed by fusing together a mixture comprising 1500 parts of a foundation batch capable of making substantially clear glass, 80 to 160 parts of aluminum oxid, 100 to 170 parts of a fluorid containing about 50% by weight of fluorin, and 100 to 200 parts of a second fluorid.

5. A glass formed by fusing together a mixture comprising 1500 parts of a foundation batch capable of making substantially clear glass and including zinc oxid, 80 to 160 parts of aluminum oxid, 100 to 170 parts of a fluorid containing about 50% by weight of fluorin, and 100 to 200 parts of sodium silico fluorid.

6. A glass formed by fusing together a mixture comprising 1500 parts of a foundation mixture capable of making substantially clear glass, with compounds containing from 40 to 90 parts of aluminum and 110 to 200 parts of fluorin, one of said compounds being sodium silico fluorid.

7. A glass formed by fusing together a mixture comprising 1500 parts of a foundation mixture capable of making substantially clear glass, and including zinc oxid, with compounds containing from 40 to 90 parts of aluminum and 110 to 200 parts of fluorin.

8. A glass formed by fusing together a mixture comprising 1500 parts of a foundation mixture capable of making substantially clear glass, with compounds containing from 40 to 90 parts of aluminum and 110 to 200 parts of fluorin, one of said compounds being sodium silico fluorid and another being fluorspar.

GEO. A. MACBETH.